(12) United States Patent
Kokko et al.

(10) Patent No.: US 11,588,841 B2
(45) Date of Patent: *Feb. 21, 2023

(54) GENERATING MALICIOUS NETWORK TRAFFIC DETECTION MODELS USING CLONED NETWORK ENVIRONMENTS

(71) Applicant: Splunk Inc., San Francisco, CA (US)

(72) Inventors: Kurt Kokko, Seattle, WA (US); Damien Lindauer, Seattle, WA (US); Brad Lovering, Seattle, WA (US); Lynn Kasel, Seattle, WA (US)

(73) Assignee: Splunk Inc., San Francisco, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/872,077

(22) Filed: May 11, 2020

(65) Prior Publication Data

US 2020/0344254 A1 Oct. 29, 2020

Related U.S. Application Data

(63) Continuation of application No. 15/885,709, filed on Jan. 31, 2018, now Pat. No. 10,652,261.

(Continued)

(51) Int. Cl.
*G06F 21/00* (2013.01)
*H04L 9/40* (2022.01)
(Continued)

(52) U.S. Cl.
CPC .......... *H04L 63/1425* (2013.01); *G06F 21/53* (2013.01); *G06F 21/54* (2013.01); *H04L 63/1433* (2013.01); *G06N 20/00* (2019.01)

(58) Field of Classification Search
CPC . H04L 63/1425; H04L 63/1433; G06F 21/53; G06F 21/54; G06N 20/00
See application file for complete search history.

(56) References Cited

U.S. PATENT DOCUMENTS 8,776,229 B1 * 7/2014 Aziz ................... H04L 63/0245
713/193
9,882,929 B1 * 1/2018 Ettema ................ H04L 63/1491
(Continued)

OTHER PUBLICATIONS

Non-Final Office Action, U.S. Appl. No. 15/885,709, dated Oct. 24, 2019, 5 pages.
(Continued)

*Primary Examiner* — Ghazal B Shehni
(74) *Attorney, Agent, or Firm* — Nicholson De Vos Webster & Elliott LLP

(57) ABSTRACT

Techniques and mechanisms are disclosed for creating an environment for detecting malicious network traffic. A test computer network including a plurality of cloned nodes is created. The plurality of cloned nodes in the test computer network corresponds to at least some of a plurality of target nodes of a host computer network, and the test computer network has no network connectivity to the host computer network. Sensors in both the host computer network and the test computer network generate network flow records that are sent to a detection processing pipeline. The detection processing pipeline merges the records received from the sensors and uses the merged records to train at least one model used to identify instances of malicious network traffic.

20 Claims, 2 Drawing Sheets

Related U.S. Application Data

(60) Provisional application No. 62/453,462, filed on Feb. 1, 2017.

(51) Int. Cl.
*G06F 21/54* (2013.01)
*G06F 21/53* (2013.01)
*G06N 20/00* (2019.01)

(56) References Cited

U.S. PATENT DOCUMENTS

| | | | |
|---|---|---|---|
| 2008/0271019 A1* | 10/2008 | Stratton | G06F 21/577 718/1 |
| 2014/0283052 A1* | 9/2014 | Jordan | H04L 63/1441 726/23 |
| 2015/0248554 A1* | 9/2015 | Dumitru | G06F 9/45558 726/1 |
| 2018/0027009 A1* | 1/2018 | Santos | H04L 63/1441 726/25 |

OTHER PUBLICATIONS

Notice of Allowance, U.S. Appl. No. 15/885,709, dated Jan. 8, 2020, 5 pages.

\* cited by examiner

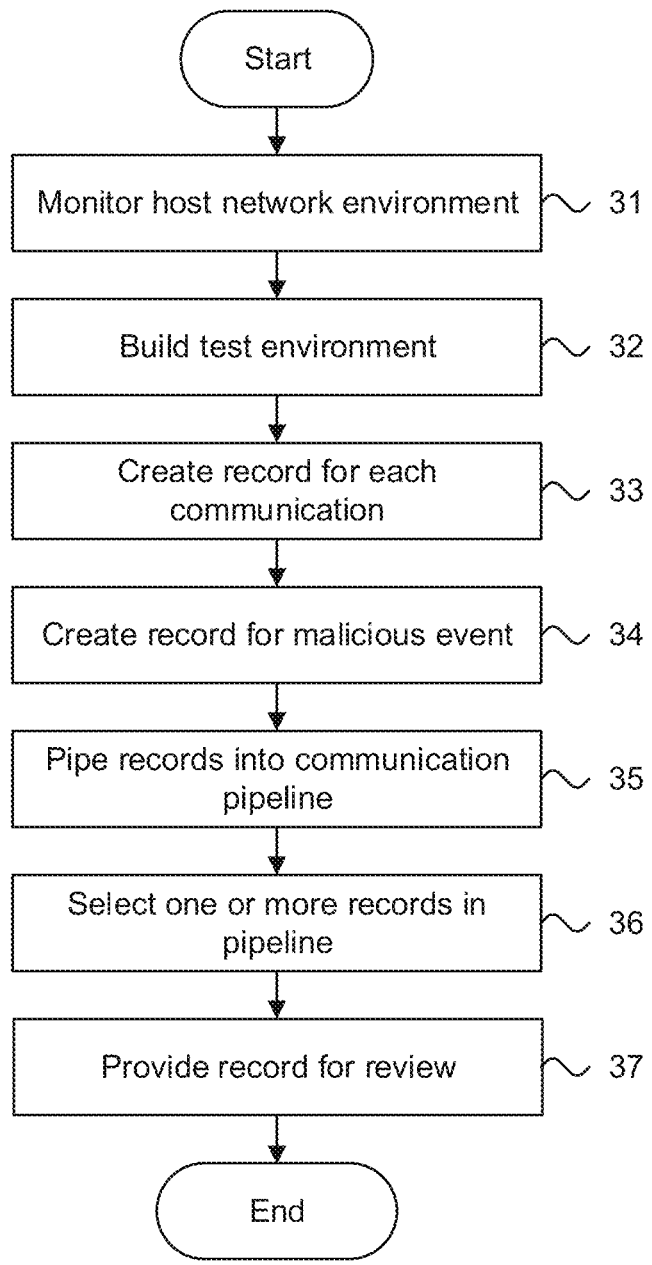

GENERATING MALICIOUS NETWORK TRAFFIC DETECTION MODELS USING CLONED NETWORK ENVIRONMENTS

CROSS-REFERENCE TO RELATED APPLICATION

This application claims benefit under 35 U.S.C. § 120 as a continuation of U.S. application Ser. No. 15/885,709, filed Jan. 31, 2018, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

The parent application Ser. No. 15/885,709 claims the benefit of U.S. Provisional Application Ser. No. 62/453,462, filed on Feb. 1, 2017, the entire contents of which are hereby incorporated by reference as if fully set forth herein.

FIELD

This application relates in general to analyzing network traffic, and in particular to a computer-implemented system and method for creating an environment for detecting malicious content.

BACKGROUND

Monitoring network traffic is extremely important for businesses, as well as smaller organizations and personal use to ensure network performance, availability, and security. Network traffic monitoring can include reviewing incoming and outgoing data packets for possible event occurrences that affect network functioning, such as security breaches and performance bottlenecks, which can slow the network.

Conventional methods for monitoring network traffic exist for enterprise business environments, small business environments, and personal use in some cases. Such methods often create test network traffic for the development and validation of network security detection capabilities. However, conventional network traffic monitoring techniques can introduce issues into how detection is developed and tested since modern detection is moving towards machine learning. In some cases, effective testing on a live network may rely on live production nodes, which is generally undesirable due to placing the live network at actual risk.

Therefore, there is a need for an approach to generating test network traffic for the development and validation of efficient and accurate network security detection.

BRIEF DESCRIPTION OF THE DRAWINGS

In the drawings:

FIG. 2 is a flow diagram showing a computer-implemented method for creating an environment for detecting malicious content, in accordance with one embodiment.

DETAILED DESCRIPTION

Figure 1:
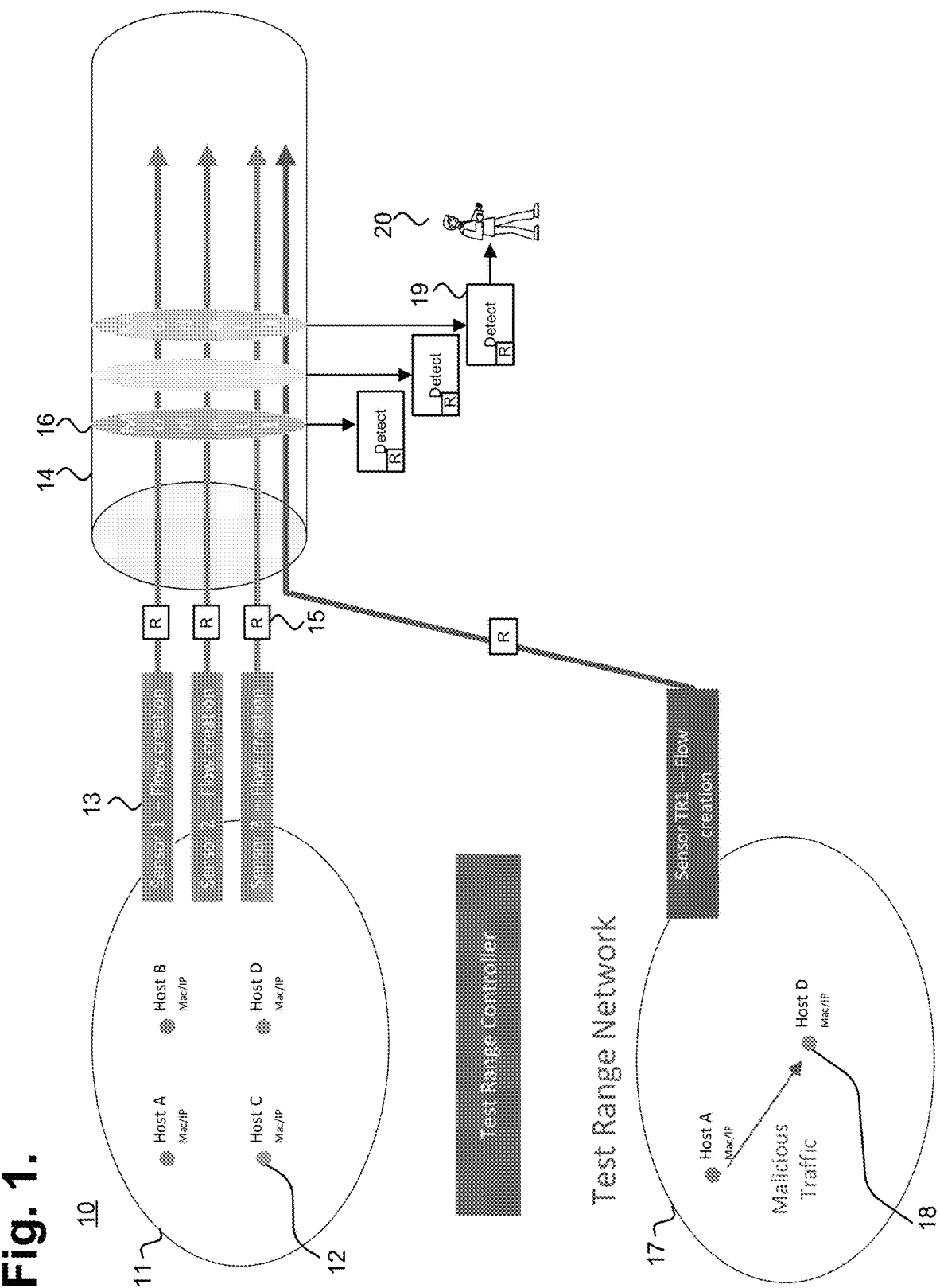
FIG. 1 is a block diagram showing a computer-implemented system for creating an environment for detecting malicious content, in accordance with one embodiment.

Network traffic within an environment should be continuously monitored to ensure proper performance of the network and to detect attempts of breach. Conventional network monitoring systems exist, but typically rely on copies of network traffic with malicious traffic that are replayed for testing the identification of the malicious traffic. However, network detection is moving towards machine learning, which requires training of classifiers using realistic data to obtain the most effective and accurate detection of malicious events. Malicious traffic is then created on the test range network and then that traffic's flow records are placed into a dataflow with traffic from the live network which allows for accurate detection in a live setting.

FIG. 1 is a block diagram showing a computer-implemented system for creating an environment for detecting malicious content, in accordance with one embodiment. A host network 11 is identified for which network security detection is to be applied. The host network can be maintained by an organization, such as a business social group, or family, as well as by an individual, and can include nodes 12, which each represent a computing device, such as a server, container, desktop computer, laptop, tablet, mobile telephone, printer, or scanner, as well as other types of computing devices. Each computing device 12 in the host network 11 can be identified via a unique media access control (MAC) address and internet protocol (IP) address. One or more sensors 13 are placed within the host network environment for monitoring communication of the nodes. The communication can include internal communication between the nodes, as well as communication to and from the nodes via nodes external to the host network.

A test network environment 17 is created based on the host network for use as a test range in detecting malicious traffic within the host network. The test network environment 17 includes clones 18 of at least a portion of the nodes in the host network. A sensor 13 is also provided within the test network environment 17 to monitor communication of the nodes.

For each communication identified in the host network and the test network, a record 15 is generated. Each record can include metadata about the communication, including a MAC address and IP address of the nodes participating in the communication. Once generated, the records are sent through a detection processing pipeline 14, which includes a set of models 16 that each represent a mathematical, machine learning, or matching, or other method, to identify evidence of a communication as malicious traffic. The models rely on understanding of and learning what is normal network behavior in a given network environment so that evidence of malicious behavior can be identified. By overlaying traffic from the test network on top of the actual network traffic, the models can be tuned to effectively identify evidence of malicious behavior within the normal network traffic. Since traffic varies widely from one network to another, the ability to tune the models to find the malicious test traffic over the top of the actual real-world network traffic, versus looped or synthetic test traffic, makes the detections from the models far more accurate.

If the record matches one or more of the models, the record 19 is pulled from the detection processing pipeline 14 and provided to an end user 20 for further review. In one embodiment, upon selection of the record 19 from the detection processing pipeline 14, the record can be transmitted for further computer based processing and analysis prior to providing the record to the end user 20. For example, the selected records can further be compared with prior traffic and events.

The computing devices and servers can each include one or more modules for carrying out the embodiments disclosed herein. The modules can be implemented as a computer program or procedure written as source code in a conventional programming language and is presented for execution as instructions by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

FIG. 2 is a flow diagram showing a computer-implemented method 30 for creating an environment for detecting malicious content, in accordance with one embodiment. A host network with multiple nodes is monitored (block 31). One or more target nodes in the host network are cloned and used to build (block 32) a test environment. The cloned nodes each include the MAC address and the IP address of the target node that is cloned. Additionally, the cloned nodes can each include the operating system (OS) system/patch level, ports and services available on the system, such as Domain Name Service (DNS), Lightweight Directory Access Protocol (LDAP), and web services. Thus, the network configuration of the clone network is similar or identical to the host network. However, the cloned nodes are not associated with specific data, such as the specific communication, that is associated with each of the target nodes in the host network. Further, although the test network environment is a clone of target nodes in the host network, the test range is completely isolated from the host network and has no routing or other network connectivity to the host network, in one embodiment.

Each of the cloned nodes can be generated manually, or automatically via a controller that surveys the live host network and allows selection of target nodes to be replicated in the test network by finding a duplicating critical infrastructure targets, such as DNS or LDAP, synchronizing the test environment copy of a current state of the host network, such as MAC change, IP change, and services changes. The number of cloned nodes necessary for each test network can be determined based on a type of testing or detection to be performed. For example, malware enters a network and makes a connection. Reconnaissance is performed across the network. One or more exploited nodes are identified and removed off the network. In this example, 42 nodes are required to simulate such a scenario and that is the minimum number of cloned nodes necessary for the test environment. Different types of testing require different numbers of cloned nodes. Further, changes to the host network can be reflected by the nodes during one or more updates to the cloned nodes in the test network.

Sensors are placed within the host network and the test network to identify communication to and from the nodes and the cloned nodes, respectively. A record is generated (block 33) for each identified communication or conversation, and can include metadata about that communication, such as the communication initiator and recipient nodes, a length of time of the communication, a number of data packets for the communication, a size of the communication, and MAC and IP addresses for the communicating nodes. Other types of information can also be included in the records. Additionally, traffic will occur between nodes on the test range through manual activity or scripts as if an individual was performing malicious actions. Specifically, the traffic is generated by the nodes themselves across the test network, and a record is generated (block 34) with details of the communication within the traffic. The records from the host network and the test network are introduced (block 35) to a detection processing pipeline, which includes detection models for communications that may include or be categorized as malicious traffic. In a further embodiment, all the records from the host network and the flow records from the test network are piped into the detection processing pipeline.

Specifically, the records from the host network and the test network are merged together in the detection processing pipeline to obtain merged network flow records and appear to originate from the same source based on the IP/MAC pairings associated with the traffic. The real traffic from a target node on the host network follows usual traffic patterns, while the records for malicious traffic from the test network are merged in the actual node flow records for observation by the detection models. This allows testing of network security detectors against malicious traffic in a true production network flow environment, without impacting or putting the real production network at risk.

The detection models can identify nodes based on rules, such as how often node A communicates with node B. Other examples of detection models include statistical analysis and machine learning based matching of malicious behavior patterns. If the metadata in the record satisfies the one or more of the model rules, that record is selected (block 36) and provided (block 37) to an end user for further review and possible classification as malicious. In a further embodiment, further analysis can be performed on the selected record before transmitting the records to the end user.

The ability to accurately detect malicious traffic can be useful during development of detection models, for internal quality assurance of detection models, end user testing, external validation of model behavior against varied customer traffic flows, sales demonstrations against live customer network traffic, generating labeled data for machine learning, and training for customer security operations center staff on response to malicious events. With respect to procuring sales, network traffic detection can be used to show a potential customer that the product is working by identifying malicious traffic that is generated in the test network.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method comprising:
   receiving input identifying a type of network traffic monitoring to be performed on network traffic traversing a host computer network including a plurality of network nodes, wherein the type of network traffic monitoring relates to identifying one or more types of malicious activity in the host computer network;
   selecting, by a controller, a number of the plurality of network nodes to be replicated in a test computer network, wherein the number of the plurality of network nodes to be replicated in the test computer network is selected based on the type of network traffic monitoring to be performed on the network traffic traversing the host computer network; and causing the controller to create the test computer network, wherein creating the test computer network includes creating a plurality of cloned network nodes equal to the number of the plurality of network nodes to be replicated in the test computer network, and wherein each of the plurality of cloned network nodes corresponds to a respective network node of the plurality of network nodes.

2. The computer-implemented method of claim 1, further comprising:

obtaining, from at least one first sensor coupled to the host computer network, first network flow records generated by the at least one first sensor based on first network traffic involving the plurality of network nodes;

obtaining, from at least one second sensor coupled to the test computer network, second network flow records generated by the at least one second sensor based on second network traffic involving network nodes of the plurality of cloned network nodes;

merging, by a detection processing pipeline, the first network flow records and the second network flow records to obtain merged network flow records; and training a machine learning model to identify instances of malicious network traffic based on the merged network flow records.

3. The computer-implemented method of claim 2, wherein the second network flow records include at least one network flow record reflecting an instance of malicious network traffic artificially introduced into the test computer network.

4. The computer-implemented method of claim 2, further comprising:

obtaining additional network flow records generated by the at least one first sensor based on additional network traffic involving the plurality of network nodes of the host computer network;

using the machine learning model to identify an instance of malicious network traffic based on the additional network flow records; and generating an alert indicating the instance of the malicious network traffic.

5. The computer-implemented method of claim 2, further comprising:

obtaining additional network flow records generated by the at least one first sensor based on additional network traffic involving the plurality of network nodes of the host computer network;

using the machine learning model to identify an instance of malicious network traffic based on the additional network flow records; and using the instance of malicious network traffic to search for other network flow records related to the instance of malicious network traffic.

6. The computer-implemented method of claim 2, wherein a network flow record of the first network flow records corresponds to a communication between a first node and a second node of the plurality of network nodes, and wherein the network flow record identifies one or more of: an initiating node, a receiving node, a length of time of associated with the communication, a number of data packets associated with the communication, a size of the communication, MAC addresses associated with the first node and the second node, and IP addresses associated with the first node and the second node.

7. The computer-implemented method of claim 2, wherein the detection processing pipeline includes a plurality of machine learning models, and wherein each of the plurality of machine learning models is used to identify one or more particular types of malicious network traffic.

8. The computer-implemented method of claim 2, wherein the merged network flow records appear to originate from the plurality of network nodes of the host computer network.

9. The computer-implemented method of claim 2, wherein the second network traffic is generated based on one or more scripts that in part generate the malicious network traffic.

10. The computer-implemented method of claim 2, wherein the first network flow records are overlaid on the second network flow records to obtain the merged network flow records.

11. The computer-implemented method of claim 1, wherein the host computer network has no network connectivity to the test computer network.

12. The computer-implemented method of claim 1, wherein at least one of the plurality of cloned network nodes is assigned a media access control (MAC) address and an internet protocol (IP) address of a corresponding node of the plurality of network nodes.

13. The computer-implemented method of claim 1, wherein at least one of the plurality of cloned network nodes is configured to match at least one of the following configurations of a corresponding node of the plurality of network nodes: an operating system, a patch level, available ports, and available services.

14. A system comprising:

a first one or more electronic devices to implement a network monitoring application, wherein the network monitoring application includes first instructions that upon execution cause the network monitoring application to:

receive input identifying a type of network traffic monitoring to be performed on network traffic traversing a host computer network including a plurality of network nodes, wherein the type of network traffic monitoring relates to identifying one or more types of malicious activity in the host computer network, cause a controller to create a test computer network; and a second one or more electronic devices to implement the controller, wherein the controller includes second instructions that upon execution cause the controller to:

select a number of the plurality of network nodes in the host computer network to be replicated in a test computer network, wherein the number of the plurality of network nodes to be replicated in the test computer network is selected based on the type of network traffic monitoring to be performed on the network traffic traversing the host computer network; and create the test computer network, wherein creating the test computer network includes creating a plurality of cloned network nodes equal to a number of the plurality of network nodes to be replicated in the test computer network, and wherein each of the plurality of cloned network nodes corresponds to a respective network node of the plurality of network nodes.

15. The system of claim 14, wherein the first instructions, upon execution, further cause the network monitoring application to:

obtaining, from at least one first sensor coupled to the host computer network, first network flow records generated by the at least one first sensor based on first network traffic involving the plurality of network nodes;

obtaining, from at least one second sensor coupled to the test computer network, second network flow records generated by the at least one second sensor based on second network traffic involving network nodes of the plurality of cloned network nodes;

merging, by a detection processing pipeline, the first network flow records and the second network flow records to obtain merged network flow records; and training a machine learning model to identify instances of malicious network traffic based on the merged network flow records.

16. The system of claim 15, wherein the second network flow records include at least one network flow record reflecting an instance of malicious network traffic artificially introduced into the test computer network.

17. The system of claim 15, wherein the first instructions, upon execution, further cause the network monitoring application to:

obtaining additional network flow records generated by the at least one first sensor based on additional network traffic involving the plurality of network nodes of the host computer network;

using the machine learning model to identify an instance of malicious network traffic based on the additional network flow records; and generating an alert indicating the instance of the malicious network traffic.

18. The system of claim 15, wherein the first instructions, upon execution, further cause the network monitoring application to:

obtaining additional network flow records generated by the at least one first sensor based on additional network traffic involving the plurality of network nodes of the host computer network;

using the machine learning model to identify an instance of malicious network traffic based on the additional network flow records; and using the instance of malicious network traffic to search for other network flow records related to the instance of malicious network traffic.

19. The system of claim 14, wherein the host computer network has no network connectivity to the test computer network.

20. The system of claim 14, wherein at least one of the plurality of cloned network nodes is assigned a media access control (MAC) address and an internet protocol (IP) address of a corresponding node of the plurality of network nodes.

* * * * *